US010214652B2

(12) United States Patent
Dreissigacker et al.

(10) Patent No.: US 10,214,652 B2
(45) Date of Patent: Feb. 26, 2019

(54) ALUMINUM-COPPER COMPOSITE SEMI-FINISHED PRODUCT FOR ELECTRICAL ENGINEERING AND METHOD FOR PRODUCING SAME

(71) Applicant: Doduco GmbH, Pforzheim (DE)

(72) Inventors: Uwe Dreissigacker, Engelsbrand (DE); Helena Tribus, Pforzheim (DE)

(73) Assignee: DODUCO SOLUTIONS GMBH, Pforzheim (DE)

(*) Notice: Subject to any disclaimer, the term of this patent is extended or adjusted under 35 U.S.C. 154(b) by 132 days.

(21) Appl. No.: 15/364,964

(22) Filed: Nov. 30, 2016

(65) Prior Publication Data

US 2017/0081525 A1  Mar. 23, 2017

Related U.S. Application Data

(63) Continuation of application No. PCT/EP2016/050894, filed on Jan. 18, 2016.

(30) Foreign Application Priority Data

Feb. 3, 2015 (DE) ........................ 10 2015 101 527

(51) Int. Cl.
| | | |
|---|---|---|
| C09D 5/08 | (2006.01) |
| B32B 15/01 | (2006.01) |
| C08F 2/48 | (2006.01) |
| C09D 4/00 | (2006.01) |
| C09D 133/08 | (2006.01) |
| C09D 163/00 | (2006.01) |
| B05D 7/16 | (2006.01) |
| B21B 1/38 | (2006.01) |
| B32B 7/10 | (2006.01) |
| B32B 37/10 | (2006.01) |
| B32B 37/16 | (2006.01) |
| C09D 133/14 | (2006.01) |
| H01B 1/02 | (2006.01) |
| H01B 3/44 | (2006.01) |
| H01B 5/00 | (2006.01) |
| H01B 13/00 | (2006.01) |
| C09D 7/40 | (2018.01) |

(52) U.S. Cl.
CPC ............. *C09D 5/08* (2013.01); *B05D 7/16* (2013.01); *B21B 1/38* (2013.01); *B32B 7/10* (2013.01); *B32B 15/015* (2013.01); *B32B 15/017* (2013.01); *B32B 37/10* (2013.01); *B32B 37/16* (2013.01); *C08F 2/48* (2013.01); *C09D 4/00* (2013.01); *C09D 133/08* (2013.01); *C09D 133/14* (2013.01); *C09D 163/00* (2013.01); *H01B 1/02* (2013.01); *H01B 3/447* (2013.01); *H01B 5/002* (2013.01); *H01B 13/003* (2013.01); *H01B 13/0036* (2013.01); *B32B 2250/02* (2013.01); *B32B 2255/06* (2013.01); *B32B 2255/26* (2013.01); *B32B 2307/202* (2013.01); *B32B 2307/714* (2013.01); *B32B 2457/00* (2013.01); *C09D 7/40* (2018.01)

(58) Field of Classification Search
CPC . B32B 15/015; B32B 15/017; B32B 2457/00; B32B 2307/714; B32B 2307/202; B32B 2255/26; B32B 2255/06; B32B 2250/02; C08F 2/48; C08F 220/18; C08F 2222/1086; C08F 2222/1093; C09D 5/00; C09D 133/08; C09D 163/00; C09D 133/14; C09D 7/40; B01B 1/02; B01B 5/002; B01B 13/003; B01B 3/447; B01B 13/0036

See application file for complete search history.

(56) References Cited

U.S. PATENT DOCUMENTS

| | | | |
|---|---|---|---|
| 3,299,112 A * | 1/1967 | Bailey ................ | B01F 17/0071 516/199 |
| 4,210,712 A | 7/1980 | Munger et al. | |
| 6,548,121 B1 | 4/2003 | Bauer et al. | |
| 2007/0045801 A1* | 3/2007 | Sugiyama et al. ... | H05K 1/0271 257/684 |
| 2008/0057292 A1* | 3/2008 | Bletsos et al. ......... | B32B 5/022 428/315.9 |
| 2014/0220355 A1* | 8/2014 | Nagelsdiek et al. ......... | C09D 163/00 428/412 |

FOREIGN PATENT DOCUMENTS

| | | |
|---|---|---|
| CN | 101 654 570 A | 2/2010 |
| WO | WO 00/24527 A1 | 5/2000 |

* cited by examiner

Primary Examiner — Nathan M Nutter
(74) Attorney, Agent, or Firm — Bose McKinney & Evans LLP

(57) ABSTRACT

A semi-finished product for electrical engineering is described, which is a composite of an aluminum sheet and a copper sheet. According to this disclosure, the semi-finished product bears an acrylate-based protective layer, which has been applied as a lacquer, which contains at least one photoinitiator and has been cured under the effect of light to form acrylate polymer, preferably acrylate copolymer. This disclosure also relates to an unfinished product produced from such a semi-finished product. A method for producing such a semi-finished product is also described.

10 Claims, 1 Drawing Sheet

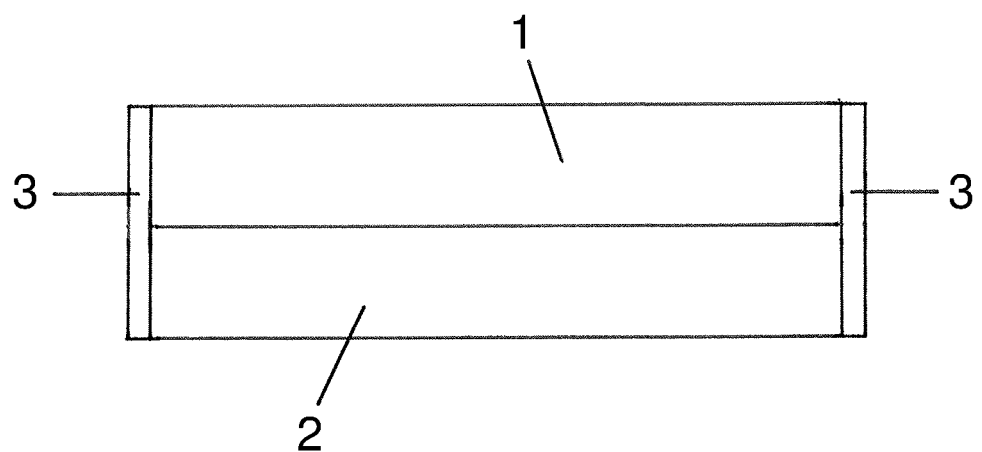

ALUMINUM-COPPER COMPOSITE SEMI-FINISHED PRODUCT FOR ELECTRICAL ENGINEERING AND METHOD FOR PRODUCING SAME

RELATED APPLICATIONS

This application is a continuation of PCT/EP2016/050894, filed Jan. 18, 2016, which claims priority to DE 10 2015 101 527.7, filed Feb. 3, 2015, both of which are hereby incorporated herein by reference in their entireties.

BACKGROUND

The invention relates to a semi-finished product for electrical engineering, which is a composite of an aluminium sheet and a copper sheet. Copper has high electrical conductivity but is an expensive raw material. Replacing some of the copper with aluminium makes it possible to produce less expensive and more lightweight semi-finished products. Such semi-finished products are also referred to as Al—Cu hybrid material and can be produced by plating aluminium sheets and copper sheets partly or completely overlapping.

A problem with aluminium-copper composite semi-finished products and the products produced therefrom is a very high susceptibility to corrosion of the aluminium-copper composite.

BRIEF DESCRIPTION OF DRAWINGS

The FIGURE schematically shows a sectional view of an illustrative embodiment of a semi-finished product according to this disclosure.

DESCRIPTION

This disclosure teaches a way to reduce the susceptibility to corrosion of aluminium-copper composite semi-finished products.

According to this disclosure, the semi-finished product is provided with an acrylate-based protective layer instead of providing corrosion protection by means of a cost-intensive galvanized coating. Said protective layer does not need to cover the entire surface of the semi-finished product but can be applied in a targeted manner to the parts of the surface of the semi-finished product that require corrosion protection, that is, those parts of the surface that are not used subsequently for electrical contact. The protective layer is applied as a lacquer, which contains at least one photoinitiator. The lacquer is then cured under the effect of light to form acrylate polymer, preferably acrylate copolymer.

For example, aromatic epoxy acrylate monomers, aliphatic epoxy acrylate monomers and/or polyester acrylate monomers can be used as the acrylate monomers in the not yet cured lacquer. Suitable monomers are for example 2-phenoxyethyl acrylate monomers and tetrahydrofurfuryl acrylate monomers. In addition, acrylate oligomers, for example urethane acrylate oligomers or polyester-modified epoxy-di-acrylates, can be added to the lacquer.

An advantageous refinement of this disclosure provides for the lacquer to contain two or more different photoinitiators that have different absorption spectra. In this manner, the radiation-induced polymerisation can be greatly accelerated, since larger ranges of the spectrum of a radiation source can be utilised. This is a significant advantage for economical manufacture, since short polymerisation times imply correspondingly short exposure times of the semi-finished product under a radiation source. Particularly well-suited are photoinitiators that induce polymerisation of the lacquer under the effect of UV radiation. For example, trimethyl benzophenone, α-hydroxyketone, 2-hydroxy-2-methylpropiophenone, 2-hydroxy-2-methyl-1-phenylpropan-1-one and/or bis(2,4,6-trimethylbenzoyl)phenylphosphine oxide can be used as photoinitiators.

A further advantageous refinement of this disclosure provides for the lacquer to contain at least one adhesion promoter, preferably an acrylate-based adhesion promoter, as an additive. Particularly well-suited are methacrylate-based adhesion promoters, for example phosphoric acid methacrylate. In this manner, the adhesion of the lacquer to the aluminium and copper surfaces of the semi-finished product can be improved. Alternatively or additionally, the lacquer can contain a substrate wetter, for example based on polysiloxane, and/or a rheological additive, preferably based on silicate, for example bentonite, phyllosilicate or silicic acid.

A further advantageous refinement of this disclosure provides for the lacquer to contain quartz powder and/or talcum as a filler.

A further advantageous refinement of this disclosure provides for the lacquer still to contain reactive monomers after curing under the effect of light, in order to allow improved adhesion between lacquer and plastic when the semi-finished product is further processed by encapsulation with plastic.

The lacquer used according to this disclosure can have the following constituents, for example:
- up to 40 wt %, preferably 20 to 35 wt % aromatic epoxy acrylate monomers,
- up to 15 wt %, preferably 5 to 15 wt % aliphatic epoxy acrylate monomers,
- 10 to 30 wt % reactive diluent,
- 0.5 to 10 wt % adhesion promoter,
- 1 to 10 wt % photoinitiator,
- 15 to 35 wt % filler or pigment,
- up to 10% additives, for example defoamer, substrate wetter, rheological additives, flow modifier, dispersants and/or thickener.

The weight percentages of the specified components can add up to 100 wt %, but can also be less in a lacquer if it contains additional components that are not specified above, for example acrylate oligomers, in particular urethane acrylate oligomers. Each component specified can be a mixture of different substances. For example, the lacquer can contain 1 to 10 wt % of a single photoinitiator or several photoinitiators that together add up to 1 to 10 wt %. Likewise, several different fillers or pigments can be used, for example.

An illustrative embodiment of the lacquer can have the following composition:
- 10 to 25 wt % 2-phenoxyethyl acrylate as monomers,
- 10 to 50 wt % epoxy acrylate as binder,
- 10 to 25 wt % tetrahydrofurfuryl acrylate as monomers,
- 5 to 10 wt % urethane acrylate oligomer as binder,
- 5 to 10 wt % 2-acrylic acid, reaction products with pentaerythritol as accompanying substances,
- 1 to 5 wt % 2-hydroxy-2 methyl propiophenone as photoinitiator,
- 1 to 5 wt % phenylbis(2,4,6-trimethylbenzoyl)-phosphine oxide as photoinitiator,
- up to 0.1 wt % acrylic acid as accompanying substance.

A semi-finished product according to this disclosure can be produced by placing an aluminium sheet and a copper sheet one on top of the other in an edge region and then joining them by rolling. It is also possible to place an aluminium sheet and a copper sheet such that one lies completely on top of the other and then to join them by rolling. The aluminium sheet can for example consist of AlSi1 or another aluminium alloy that preferably contains at least 99 wt % aluminium. The copper sheet can for example consist of OF copper or a copper alloy that contains at least 99 wt % copper. The copper sheet can for example also consist of bronze, in particular CuSnx where x≤20, or of brass, in particular CuZnx where 5≤x≤37.

A semi-finished product according to this disclosure can be in the form of a sheet, for example a strip or hoop. A semi-finished product according to the invention can be further processed to form an unfinished product, for example by punching, bending or another forming method. During the production of an unfinished product according to the invention, a semi-finished product according to this disclosure can also have plastic moulded on or around it, for example.

The FIGURE schematically shows a sectional view of an illustrative embodiment of a semi-finished product according to this disclosure, which consists of an aluminium sheet 1 and a copper sheet 2. The semi-finished product bears an acrylate-based protective layer 3 on the sides on which the aluminium sheet 1 is adjacent to the copper sheet 2.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method for producing a semi-finished product for electrical engineering comprising the following steps:
   producing a composite from an aluminium sheet and a copper sheet, wherein the aluminium sheet and the copper sheet are joined by rolling;
   applying an acrylate-based lacquer to the composite, the acrylate-based lacquer containing acrylate monomers and at least one photoinitiator; and
   polymerizing the acrylate monomers with radiation.

2. The method according to claim 1, wherein at least some of the acrylate monomers are aromatic or aliphatic epoxy acrylate monomers.

3. The method according to claim 1, wherein at least some of the acrylate monomers are polyester acrylate monomers.

4. The method according to claim 1, wherein the lacquer contains a reactive diluent.

5. The method according to claim 1, wherein at least some of the acrylate monomers contain at least two ethylenic double bonds per molecule.

6. The method according to claim 1, wherein the lacquer contains an adhesion promoter as an additive.

7. The method according to claim 6, wherein the lacquer contains an acrylate-based adhesion promoter as an additive.

8. The method according to claim 7, wherein the lacquer contains a methacrylate-based adhesion promoter as an additive.

9. The method according to claim 1, wherein the lacquer contains a substrate wetter based on polysiloxane as an additive.

10. The method according to claim 1, wherein the composite is produced from an aluminium sheet and a copper sheet by placing the aluminium sheet and the copper sheet one above the other in an edge region.

* * * * *

UNITED STATES PATENT AND TRADEMARK OFFICE
CERTIFICATE OF CORRECTION

PATENT NO. : 10,214,652 B2
APPLICATION NO. : 15/364964
DATED : February 26, 2019
INVENTOR(S) : Uwe Dreissigacker and Helena Tribus Page 1 of 1

It is certified that error appears in the above-identified patent and that said Letters Patent is hereby corrected as shown below:

In the Claims

Claim 8, Column 4, Line 24, the phrase "The method according to claim 7" should read --The method according to claim 6--.

Signed and Sealed this
Sixteenth Day of April, 2019

Andrei Iancu
*Director of the United States Patent and Trademark Office*